N. W. BAECHLE.
FRICTION CLUTCH.
APPLICATION FILED SEPT. 30, 1908.

932,668.

Patented Aug. 31, 1909.
2 SHEETS—SHEET 1.

Witnesses
P. V. Ryan.
Walter E. Karns.

Inventor
Nicholas W. Baechle,
By George B. Partinson,
Attorney

N. W. BAECHLE.
FRICTION CLUTCH.
APPLICATION FILED SEPT. 30, 1908.

932,668.

Patented Aug. 31, 1909.
2 SHEETS—SHEET 2.

Witnesses
Inventor
Nicholas W. Baechle,
By George B. Partridge,
Attorney

UNITED STATES PATENT OFFICE.

NICHOLAS W. BAECHLE, OF CINCINNATI, OHIO.

FRICTION-CLUTCH.

932,668.

Specification of Letters Patent. Patented Aug. 31, 1909.

Application filed September 30, 1908. Serial No. 455,407.

*To all whom it may concern:*

Be it known that I, NICHOLAS W. BAECHLE, a citizen of the United States, residing at Cincinnati, county of Hamilton, and State of Ohio, have invented a certain new and useful Improvement in Friction-Clutches, of which the following is a specification.

My invention relates to band or strap clutches, and more particularly to the gripped element as distinguished from the band, or strap, element.

The object of my invention is to provide the gripped element with active gripping mechanism which will co-act with the strap, or band, and increase the efficiency of the clutch, and the invention consists in the parts and combination and arrangement of parts hereinafter described and claimed.

I have illustrated my invention in connection with a strap or band element such as is disclosed in Letters Patent of the United States, No. 841,659, granted me December 27, 1906, although my invention is applicable to any band clutch whether the friction is applied by expansion or contraction.

Figure 1:
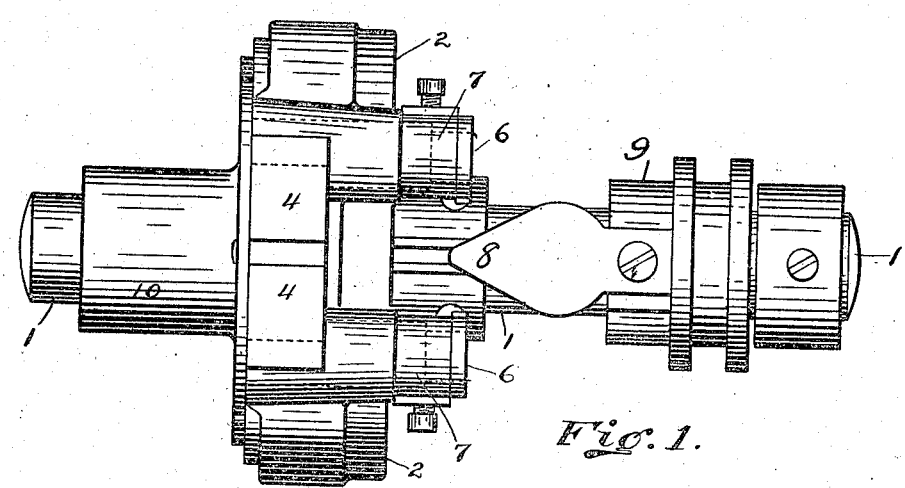
Figure 2:
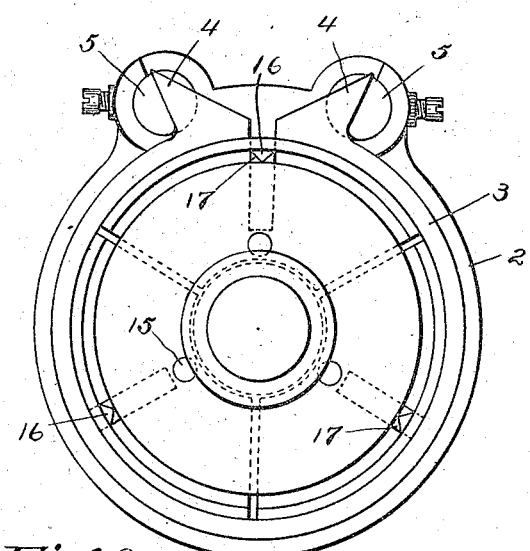
Figure 3:
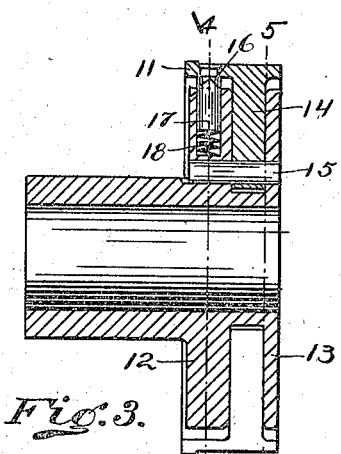
Figure 4:
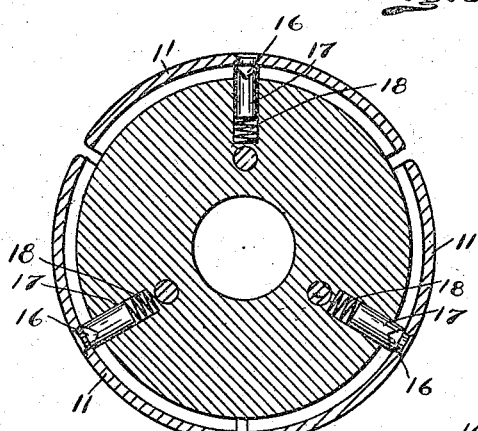
Figure 5:
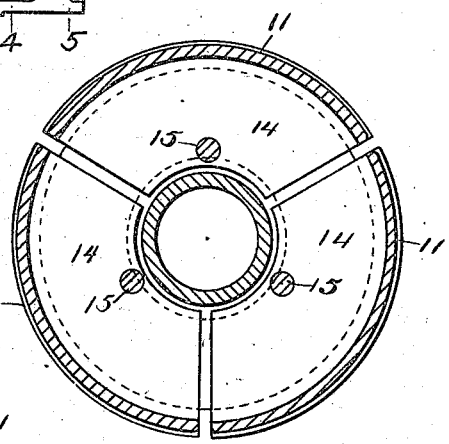
Figure 6:
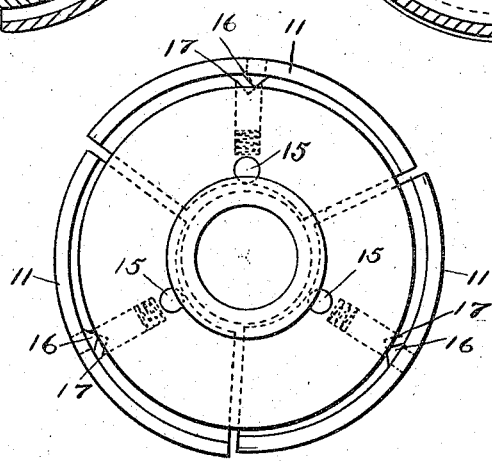

In the drawings Figure 1 is a side elevation of a friction clutch embodying my invention, Fig. 2 an end view from the left of Fig. 1, showing in dotted lines, the internal construction of the gripped element, Fig. 3 a central longitudinal section of the gripped element, Fig. 4 a vertical cross section on the line 4—4 of Fig. 3. Fig. 5 a vertical cross section on the line 5—5 of Fig. 3, and Fig. 6 an end view of the gripped element showing, in exaggerated form, the operative position of its parts.

The numeral 1 represents a shaft to which is fixed a flanged collar, or casing, 2 adapted to carry a friction strap or band 3. The band 3 is provided, near its ends, with radial lugs 4 projecting through a suitable opening in the casing and adapted to be engaged by the flattened ends, 5, of shafts 6. Each of the shafts carries a fixed crank arm 7, the free ends of which are adapted to be engaged by an angular nose, 8, carried by a shifting sleeve, 9, slidable on shaft 1. Forcing the free ends of the crank arms away from each other rotates the shafts 6 and thereby forces the lugs in the direction of each other and diametrically contracts the friction band 3. This mechanism is described more in detail in Letters Patent No. 841,659, before referred to.

10 represents a hub or sleeve loosely mounted on shaft 1 and carrying a plurality of curved friction shoes 11 adapted to be engaged by the inner face of the friction band 3 when contracted. In the form shown the hub 10 is provided with two fixed disks, or annular flanges 12 and 13 and each of the friction shoes 11 is provided with a web 14 pivoted on a spindle 15 mounted in the flanges 10 and 11.

The rim of each shoe is provided midway of its length with an inwardly projecting V-shaped lug 16 adapted to take into a V-shaped notch in a pin 17 radially mounted in flange 12 and normally held in engagement with lug 16 by means of a coiled spring 18. This arrangement holds the rims of the friction shoes in peripheral alinement when idle. In idle position the rims of the friction shoes are out of contact with, but closely adjacent to, the inner face of the friction band; the inner face of the rim of the shoe is out of contact with the peripheries of the flanges, and the inner edge of the shoe-web is out of contact with the hub.

It will be understood that the hub 10 carries a pulley or other element, not shown, designed to be locked into operative connection with the shaft 1.

To make the coupling, the shifter 9 is moved inwardly thereby contracting the friction band 3 and forcing it into engagement with the friction shoes 11, and tending to rotate them with the shaft 1. The hub 10 offers a resistance to such rotation proportional to the load it carries, and the friction shoes, having some freedom of peripheral movement, are primarily moved in the general direction of rotation of the shaft, but, the webs being pivoted eccentrically to the shaft, the pivots serve as fulcrums and the heel portions of the rims of the shoes are forced against the inner face of the friction band with a force which automatically increases as the load increases.

I claim as my invention:

1. The combination of a shaft; a clutch element mounted thereon and carrying a friction band; and a clutch element including friction shoes pivoted eccentrically to the shaft and adapted to be engaged with the friction band with means for forcing the friction band into engagement with the friction shoes.

2. The combination of a shaft, a clutch element carrying a friction band; a clutch element carrying friction shoes pivoted eccentrically to the shaft and adapted to be engaged with the friction band, one of the clutch elements being fixed to the shaft and the other loosely mounted thereon; and means for forcing the friction band into engagement with the friction shoes.

3. The combination of a shaft; a clutch element mounted thereon and carrying a friction band; and a clutch element consisting of a hub, annular flanges thereon and segmental shoes pivotally mounted in the flanges and adapted to be engaged by the friction band, with means for forcing the friction band into engagement with the friction shoes.

4. The combination of a shaft; a clutch element including a friction band; and a clutch element consisting of a hub, annular flanges thereon and segmental shoes pivotally mounted in the flanges and adapted to be engaged by the friction band, and means for normally holding the rims of the friction shoes in peripheral alinement; with means for forcing the friction band into engagement with the friction shoes.

5. The combination of a shaft; a clutch element including a friction band; and a clutch element consisting of a hub, annular flanges thereon and segmental shoes pivotally mounted in the flanges and adapted to be engaged by the friction band; V-shaped lugs projecting inwardly from the rims of the friction shoes, and notched pins radially mounted in one of the flanges and spring-held in contact with the lugs; with means for forcing the friction band into contact with the friction shoes.

NICHOLAS W. BAECHLE.

Witnesses:
 AUGUST W. BRUCK,
 GEORGE B. PARKINSON.